United States Patent
Takikawa (10) Patent No.: US 9,769,303 B2
(45) Date of Patent: *Sep. 19, 2017

(54) INFORMATION TERMINAL (71) Applicant: HONDA MOTOR CO., LTD., Tokyo (JP)

(72) Inventor: Keiichi Takikawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,054

(22) Filed: Mar. 15, 2016

(65) Prior Publication Data

US 2016/0198033 A1 Jul. 7, 2016

Related U.S. Application Data (63) Continuation of application No. 14/637,465, filed on Mar. 4, 2015, now Pat. No. 9,420,086.

(30) Foreign Application Priority Data

Mar. 5, 2014 (JP) .................. 2014-043319
Jul. 4, 2014 (JP) .................. 2014-138490

(51) Int. Cl.
*H04M 1/00* (2006.01)
*H04M 1/725* (2006.01)
*H04W 76/02* (2009.01)
*H04B 1/3822* (2015.01)
*H04W 88/04* (2009.01)

(52) U.S. Cl.
CPC ........ *H04M 1/7253* (2013.01); *H04B 1/3822* (2013.01); *H04M 1/72533* (2013.01); *H04W 76/023* (2013.01); *H04W 88/04* (2013.01)

(58) Field of Classification Search
CPC ............. H04W 76/023; H04W 76/025; H04W 76/027; H04W 76/028; H04W 76/04; H04W 88/00; H04W 88/16; H04W 88/18; H04W 4/14; H04W 4/18; H04W 4/001; H04W 4/028; H04W 4/046; H04W 48/04; H04W 48/06
USPC ...... 455/418, 419, 420, 569.2, 575.9, 556.1, 455/557

See application file for complete search history.

(56) References Cited

U.S. PATENT DOCUMENTS

2005/0284932 A1 12/2005 Sukeda et al.
2006/0161314 A1* 7/2006 Honmura ............... G01C 21/26
  701/1

(Continued)

FOREIGN PATENT DOCUMENTS

JP  2013-068423 A    4/2013
JP  2013-222270 A   10/2013
WO WO 2014/041646 A1  3/2014

*Primary Examiner* — Jean Gelin
(74) *Attorney, Agent, or Firm* — Squire Patton Boggs (US) LLP (57) ABSTRACT

A control device of an information terminal of the present invention determines whether one specified operation among multiple specified operations to an input device 11 is done. On condition that the one specified operation is determined to be done, the control device causes the input device 11 to function as an input interface used to input information in order to use a function related to one category among the multiple categories corresponding to the one specified operation.

8 Claims, 7 Drawing Sheets

(56) References Cited

U.S. PATENT DOCUMENTS

| | | | |
|---|---|---|---|
| 2009/0125585 A1* | 5/2009 | Krishnaswamy | G06Q 30/02 709/203 |
| 2012/0152108 A1 | 6/2012 | Moss | |
| 2012/0329520 A1* | 12/2012 | Akama | G01C 21/3688 455/557 |
| 2013/0007693 A1* | 1/2013 | Bliss | G06F 8/63 717/101 |
| 2013/0173374 A1* | 7/2013 | Weiss | G06Q 30/02 705/14.27 |
| 2015/0142882 A1* | 5/2015 | Wu | H04L 67/2842 709/203 |
| 2015/0161219 A1 | 6/2015 | Bendiabdallah | |
| 2015/0319199 A1 | 11/2015 | Yanashima et al. | |

\* cited by examiner

INFORMATION TERMINAL

CROSS REFERENCE TO RELATED APPLICATION

This is a Continuation of U.S. patent application Ser. No. 14/637,465 filed Mar. 4, 2015, and which claims priority from Japanese Patent Application No. 2014-043319 filed on Mar. 5, 2014 and Japanese Patent Application No. 2014-138490 filed on Jul. 4, 2014. The contents of these applications are hereby incorporated by reference.

BACKGROUND OF THE INVENTION

Field of the Invention

The present invention relates to an information terminal.

Description of the Related Art

A technique used in a navigation device to calculate the number of facilities present in a search target area for each of multiple categories and display a category list on a monitor according to the order of respective categories defined based on the calculated number is proposed (see Japanese Patent Application Laid-Open No. 2013-68423).

A technique for adjusting the layout mode of multiple content items displayed on a touch panel to improve the operability and visibility of the multiple content items is proposed (see Japanese Patent Application Laid-Open No. 2013-222270).

A technique for making a touch panel function as a touch pad used to operate an operation object displayed on an in-vehicle display when a mobile terminal device provided with the touch panel is placed in a predetermined position inside a cabin is proposed (see PCT International Publication No. WO 2014/041646 A1).

SUMMARY OF THE INVENTION

However, the display position of a function or information related to a category is difficult to find out, and this has the potential to reduce usability. When an information terminal, which is made multifunctional by installing many applications, and an in-vehicle device cooperate with each other, there arise the following problems. Namely, when the function of the in-vehicle device is excessively prioritized as a use target, the function of the information terminal is excessively hindered, and this has the potential to reduce the usability of the information terminal. On the other hand, when the function of the information terminal is excessively prioritized as a use target, excessive use of the function of the information terminal can lead to reducing the usability of the information terminal in view of the purpose of driving the vehicle.

Therefore, it is an object of the present invention to provide an information terminal capable of improving usability while classifying and displaying information and the like by category. It is another object of the present invention to provide an information terminal capable of adjusting multiple functions respectively corresponding to multiple applications upon cooperation with an in-vehicle device to improve usability.

The information terminal of the present invention is an information terminal including an input device, an output device, a communication device, and a control device, and having a cooperation function with equipment using communication through the communication device, wherein the control device is configured to determine the presence or absence of cooperation between the information terminal and the equipment, extract a specified application that meets a specified condition from multiple applications installed on the information terminal on condition that the information terminal and the equipment are determined to cooperate with each other, and display, on the output device, a functional image corresponding to the function of the specified application.

According to the information terminal of the present invention, when cooperation with equipment such as a vehicle is established, a functional image (or a GUI component) of a specified application is displayed on the output device selectively from among multiple applications installed on the information terminal. Here, the cooperation between the information terminal and the equipment means that the information terminal and the equipment (or the control device) communicate with each other by wireless or with a wire to use each other's functions or information, respectively. When the specified application has an information display function, the functional image includes an output image of the information, while when the specified application has the function of providing an information display or performing the control of the equipment according to a user's instruction, the functional image includes an input image used to input the instruction.

This causes use of the functions of applications having a low degree of usefulness or need to be prohibited in view of operational conditions of the equipment, such as the traveling safety of a vehicle, and hence avoids excessive functions available on the information terminal in a state of cooperating with the equipment. On the other hand, this enables the user of the information terminal to use the function of a specified application having a high degree of usefulness or need with an input operation to the functional image of the specified application through the input device. Therefore, the usability of the information terminal for the user in the state of cooperating with the equipment can be improved.

In the information terminal of the present invention, the control device may be configured to set, as the specified conditions, both a first specified condition common to general equipment and a second specified condition applied to specific equipment in order to extract the specified application.

According to the information terminal of the configuration, an application that meets the "first specified condition" is extracted as a specified application to prohibit use of the functions of applications having a low degree of usefulness or need in view of the operational conditions and the like related to the general equipment, thus avoiding excessive functions available on the information terminal in the state of cooperating with the equipment. In addition to this, an application that meets the "second specified condition" is extracted as a specified application to enable the user of specific equipment to use the function of the specified application with an input operation to the functional image of any other specified application having a high degree of usefulness or need through the input device. Therefore, the usability of the information terminal for the user in the state of cooperating with the equipment can be improved.

In the information terminal of the present invention, the control device may also be configured to set, as the specified condition or the second specified condition, that the specified application is classified in any of multiple specified categories applied to specific equipment in order to extract the specified application, and display the functional image of the specified application in a specified region individually assigned to each of the multiple specified categories on the output device, respectively.

According to the information terminal of the configuration, the functional image of a specified application classified in each specified category is displayed in each of multiple specified regions that constitute the output device. This can improve the convenience of the information terminal when the user uses the function of a specified application classified in a specified category desired by the user.

Note that the functional images of applications may be displayed on the output device without being classified by category in a state where the information terminal does not cooperate with equipment such as a vehicle. In the state where the information terminal does not cooperate with equipment such as a vehicle, although the functional images of applications may be displayed on the output device by being classified by category, the category may be made different from a specified category specific to the cooperation with the equipment.

In the information terminal of the present invention, the control device may further be configured such that, when an identical specified category in the multiple categories is repeatedly recognized based on a mode of input operation by the user to the input device and multiple specified applications are classified in the identical specified category, the control device displays, on the output device, functional images of the multiple specified applications while switching among the functional images sequentially according to the ranking of the multiple specified applications.

According to the information terminal of the configuration, when the same mode of input operation to the input device is repeated, the functional images of multiple specified applications belonging to a specified category corresponding to the mode are displayed sequentially according to the ranking of each specified application. This can improve the convenience of the information terminal when the user uses the function of each of the multiple specified applications classified in a specified category desired by the user.

Note that, when the functional image of a current specified application is displayed on the output device, the functional image of the previous specified application may be hidden or continue to be displayed. Further, when the functional image of the current specified application is displayed on the output device, the functional image of a specified application displayed n times before (where n is an integer of 2 or more) may be hidden.

In the information terminal of the present invention, the control device may be further configured to measure the frequency of use of the function of each of multiple specified applications belonging to the identical specified category in order to set a rank of each of the multiple specified applications in a manner to increase the rank as the frequency is higher.

According to the information terminal of the configuration, the probability that the functional image is displayed with a smaller number of times of the same mode of input operation increases, regarding specified application with higher frequency of use. This can improve the convenience of information terminal when the function of a frequently-used specified application is used. The frequency of use of the function of a specified application here includes the accumulated frequency of use on the information terminal regardless of the presence or absence of cooperation between the information terminal and the vehicle, as well as the accumulated frequency of use on the information terminal when the information terminal and the vehicle cooperate with each other.

Further, in the information terminal of the present invention, the control device may be configured to measure a frequency of use of the function of each of multiple specified applications belonging to the identical specified category in order to set the rank of each of the multiple specified applications in a manner to lower the rank or to be excluded from specified applications as the frequency of use increases in excess of a reference value.

According to the information terminal of the configuration, it can avoid allowing an unlimited use of the function of a specified application which is inadequate in that the frequency of use in a cabin is excessively high in view of driving the vehicle or the like. When the cooperation between the information terminal and the vehicle is terminated, if the function of the application is available, lowering the usability of the information terminal can be avoided.

Further, in the information terminal of the present invention, the control device may be configured to display a first functional image, which causes the output device to function as an input interface to make a function of a specified application available to the user, as the functional image of a specified application classified in a first specified category among the multiple specified categories, and display a second functional image, which causes the output device to function as an output interface, as the functional image of a specified application classified in a second specified category among the multiple specified categories.

According to the information terminal of the configuration, a functional image (input interface) for guiding an input operation to the input device for use of the function and a functional image (output interface) merely displaying information are distinctly displayed on the output device. The distinct display can improve the usability of the information terminal.

Further, in the information terminal of the present invention, the control device may be configured to limit the number of extracted specified applications in each of the multiple specified categories.

According to the information terminal of the configuration, the use of the functions of minimal specified applications is allowed in view of the purpose of driving the vehicle or the like, and this can improve the usability of the information terminal for the user in a cabin.

Further, in the information terminal of the present invention, the control device may be configured to limit the number of specified categories in order to extract the specified application.

According to the information terminal of the configuration, the use of the functions of specified applications classified in minimal specified categories is allowed in view of the purpose of driving the vehicle or the like, and this can improve the usability of the information terminal for the user in a cabin.

Further, in the information terminal of the present invention, the control device may be configured such that, based on a mode of user gesture on the input device, the control device switches from a first state, where the respective functional images of a main application and a sub-application among the specified applications are displayed on the output device, to a second state, where only the functional image of the main application among the specified applications is displayed on the output device.

According to the information terminal of the configuration, since the user is allowed to shift a display state of the functional image to another with a predetermined mode of input operation to the input device, the usability of the information terminal can be improved.

Further, in the information terminal of the present invention, the control device may be configured to determine whether or not one specified operation among multiple specified operations is done to the input device, and on condition that the one specified operation is determined to be done, cause the input device to function as an input interface used to input information in order to use a function related to one category corresponding to the one specified operation among the multiple categories.

According to the information terminal of the present invention, the input device functions as an input interface related to a category associated with a specified operation on condition that the specified operation is done. As a result, the need for the user to pay attention to a screen, such as to watch the screen carefully, in order to use a function related to a category or output information classified in the category, is reduced. Therefore, the usability of the information terminal can be improved.

Note that the "input device is caused to function as an input interface used to input information in order to use a function related to one category corresponding to the one specified operation among the multiple categories" in the present invention includes a function of the input device that an information input box or the like for using a function related to the category is displayed on the output device so that information can be input in the input box displayed on the output device through the input device.

Further, in the information terminal of the present invention, it is configured that multiple of the input interfaces are classified in some or all of the multiple categories, respectively, and on condition that an identical specified operation is continuously repeated, the input device functions as each of the input interfaces according to the order of priority of each input interface in a category corresponding to the identical specified operation.

According to the information terminal of the configuration, even when there exist multiple input interfaces classified in some or all of the multiple categories, respectively, the input device can be caused to function as an input interface desired by the user by repeating a specified operation corresponding to the category. As a result, since the need for the user to pay attention to a screen, such as to watch the screen carefully, in order to use a function related to the category or acquire information classified in the category, is reduced, the usability of the information terminal can be improved.

Further, the information terminal of the present invention includes a storage device to record the number of inputs to the input interface, and the control device is configured to set the order of priority of an interface as the input interface higher as the number of inputs stored in the storage device increases.

It is highly probable that a frequently-used interface is an interface desired by the user in the future. According to the information terminal configured by paying attention to this point, the order of priority of the frequently-used interface is set high. As a result, even afterwards, since it is highly probable that the input device can be caused to function as an interface desired by the user with a small number of operations, the usability of the information terminal can be improved.

Further, the information terminal of the present invention includes an output device having a screen output function, the specified operation is an operation having a directionality corresponding to each of multiple orientations of the output device, and the control device is configured to recognize an orientation corresponding to the directionality of the specified operation, and to display a first image, which causes the input device to function as the input interface through an access, in a region present in an orientation opposite to the recognized orientation with respect to a reference point of an output image of the output device as the center.

According to the information terminal of the configuration, the first image is displayed in a region present in an orientation opposite to the orientation corresponding to the directionality of a specified operation with respect to the reference point as the center. This reduces a feeling of strangeness given to the user compared to a case where the first image is displayed in an orientation having no relation to the orientation corresponding to the directionality of the specified operation in an output image. As a result, the usability of the information terminal can be improved.

Further, in the information terminal of the present invention, either the longitudinal direction or the transverse direction of the output device is longer than the other, and the control device is configured to set, for each category, a function enabling time as the time during which the input device continues to function as an input interface included in the category, and to display the first image included in part of categories in a longer-edge region of the output device, and displays the first image included in a category shorter in the function enabling time than the part of categories in a shorter-edge region of the output device.

The display of the first image in a shorter-edge region of the output device for a long time tends to reduce the visibility of the entire output device significantly, compared to the display of the first image in a longer-edge region of the output device for a long time. According to the information terminal configured by paying attention to this point, a first image with a longer function enabling time is displayed in a longer-edge region of the output device, and a first image with a shorter function enabling time is displayed in a shorter-edge region of the output device. As a result, since the significant reduction in visibility is avoided, the usability of the information terminal can be improved.

Further, in the information terminal of the present invention, the specified operation is an operation having a directionality corresponding to each of multiple orientations of the output device, and the control device is configured to recognize an orientation corresponding to the directionality of the specified operation, and to display a second image, which causes the output device to function as the output interface, on the output device in a region present in an orientation opposite to the recognized orientation with respect to a reference point of an output image of the output device as the center.

According to the information terminal of the configuration, the second image is displayed in a region present in an orientation opposite to the orientation corresponding to the directionality of the specified operation with respect to the reference point as the center. This reduces a feeling of strangeness given to the user compared to a case where either or both of second images are displayed in an orientation having no relation to the directionality of the specified operation in an output image. As a result, the usability of the information terminal can be improved.

Further, the information terminal of the present invention further includes a communication device which performs communication with outside of the information terminal, and configured on condition that information received by the communication device from the outside is specified information specified beforehand, the second image including the information is displayed in a specified region of the output device specified beforehand.

Depending on the arrangement relation between the user and the output device and the input device of the information terminal, it may be difficult for the user to perform some specified operations. Further, it may be preferred that some or all pieces of information received from the outside should be displayed even when the user does not perform any specified operation. According to the information terminal configured by paying attention to these points, a second image including the information is displayed in a specified region specified beforehand on condition that the information received corresponds to specified information. As a result, since the received information is output to the specified region adequately while omitting a user specified operation, the usability of the information terminal can be improved.

Further, in the information terminal of the present invention, it is configured that either the longitudinal direction or the transverse direction of the output device is longer than the other, and the control device is configured to set, for each category, a function enabling time as the time during which the output device continues to function as an output interface included in the category, display the second image included in part of categories in a longer-edge region of the output device, and display the second image included in a category shorter in the function enabling time than the part of categories in the shorter-edge region of the output device.

The display of either or both of second images in shorter-edge regions of the output device for a long time tends to reduce the visibility of the entire output device significantly, compared to the display of either or both of second images in longer-edge regions of the output device for a long time. According to the information terminal configured by paying attention to this point, a second image with a longer function enabling time is displayed in a longer-edge region of the output device, and a second image with a shorter function enabling time is displayed in a shorter-edge region of the output device. As a result, since the significant reduction in visibility is avoided, the usability of the information terminal can be improved.

DESCRIPTION OF THE PREFERRED EMBODIMENTS (First Embodiment)
(Configuration)

Figure 1:
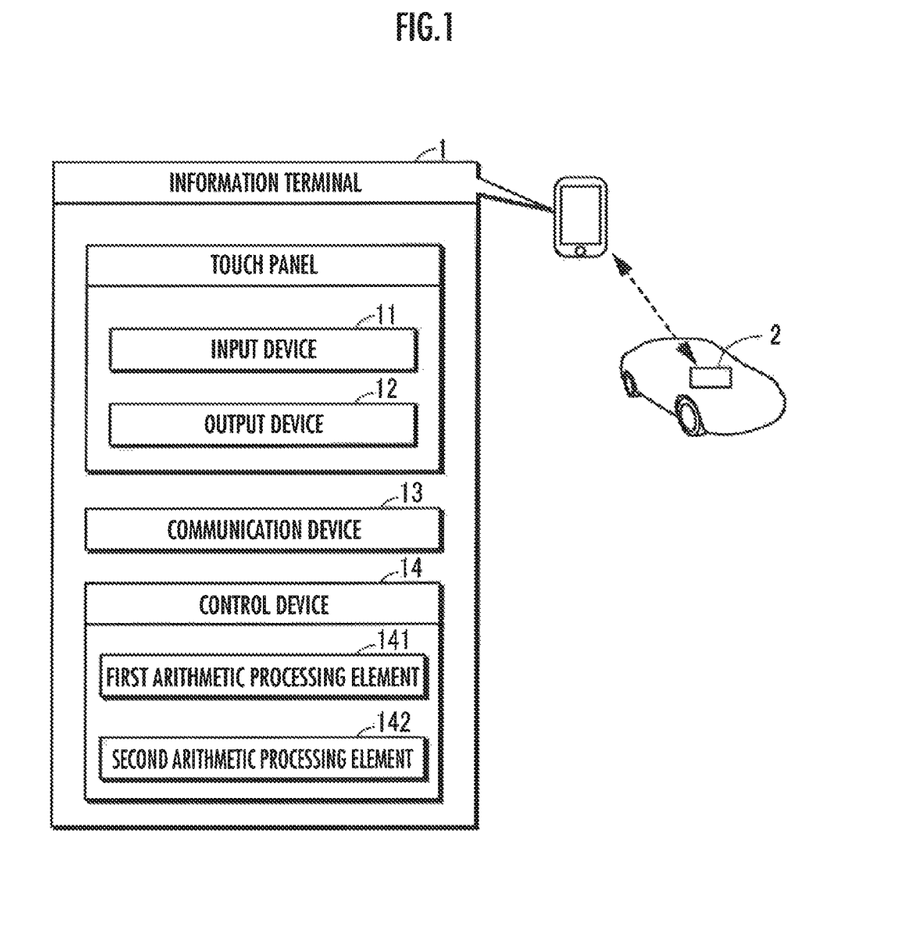
FIG. 1 is an explanatory diagram of the configuration of an information terminal as one embodiment of the present invention.

An information terminal 1 as a first embodiment of the present invention shown in FIG. 1 is configured by every information terminal with a size, shape, and weight designed to allow a user to carry, such as a tablet terminal or a smartphone. The information terminal 1 includes an input device 11, an output device 12, a communication device 13, and a control device 14. The information terminal 1 has the function of communicating with an in-vehicle control device 2 (composed of a computer (electronic control unit), a communication device, and the like, mounted in a vehicle) through the communication device 13 to cooperate with the vehicle. The information terminal 1 has a self-location measuring function using a GPS or the like. The information terminal 1 may also have a cooperation function with any other equipment, such as home electric appliance, as well as the vehicle.

The input device 11 is configured by a position input device such as a touch pad, the output device 12 is configured by a display unit such as a liquid crystal panel, and both units are combined to constitute a touch panel. In other words, the touch panel can function as both an input interface and an output interface, respectively. On the touch panel, functional images corresponding to the functions of applications (application software) installed in the information terminal 1 are displayed.

Alternatively or additionally, the input device 11 may be configured by a voice input device (microphone) or a detection device which detects a mode of user input operation (an utterance content or a gesture) in a non-contact manner such as an imaging device. When the input device 11 can identify user gesture (facial motion, or the motion of a body part such as a fingertip or an arm) in a non-contact manner such as the image device, the mode of gesture can be detected by the control device 14 as a mode of input operation. The output device 12 may be additionally configured by a voice output device (speaker).

The communication device 13 is so configured that, when the information terminal 1 is present near the vehicle such as in a cabin space, the communication device 13 can communicate with the in-vehicle control device 2 inter-communicably according to a communication standard adapted to wireless communication at a close range such as Bluetooth (registered trademark). The communication device 13 is also configured to be inter-communicable with an external terminal such as a support server (not shown) according to a communication standard adapted to wireless communication at a long range such as WiFi (registered trademark) or the like.

The control device 14 is configured by a computer (including an arithmetic processing unit and a storage device). The control device 14 functions as a user interface manager (UIM) to adjust a display content on the touch panel or the like depending on the distinction among the modes of user touch gestures on the touch panel. The touch gestures include taps (single tap, double tap, and long tap), flicks (upward flick, downward flick, left flick, and right flick), swipe, pinches (pinch-in and pinch-out) or multitouch.

The control device 14 includes a first arithmetic processing element 141 and a second arithmetic processing element 142 configured to perform arithmetic processing to be described later. The control device 14 or the constituent elements configured to perform information arithmetic processing means that the arithmetic processing unit constituting the control device is designed to read an application and necessary information from the storage device (memory) and perform the information arithmetic processing according to the application.

(Function)

The function of the information terminal 1 or the control device 14 in the above configuration will be described. It is determined whether or not cooperation between the information terminal 1 and the in-vehicle control device 2 (vehicle) is established (STEP01/FIG. 2). When the information terminal 1 and the in-vehicle control device 2 are in the power ON state, respectively, and the information terminal 1 is present in a communicable range with the in-vehicle control device 2 such as in the cabin space, cooperation between both can be established by inter-communication between the information terminal 1 and the in-vehicle control device 2 after authentication. The cooperation between the information terminal 1 and the vehicle causes the information terminal 1 and the in-vehicle control device 2 to be able to use each other's functions or information.

Figure 2:
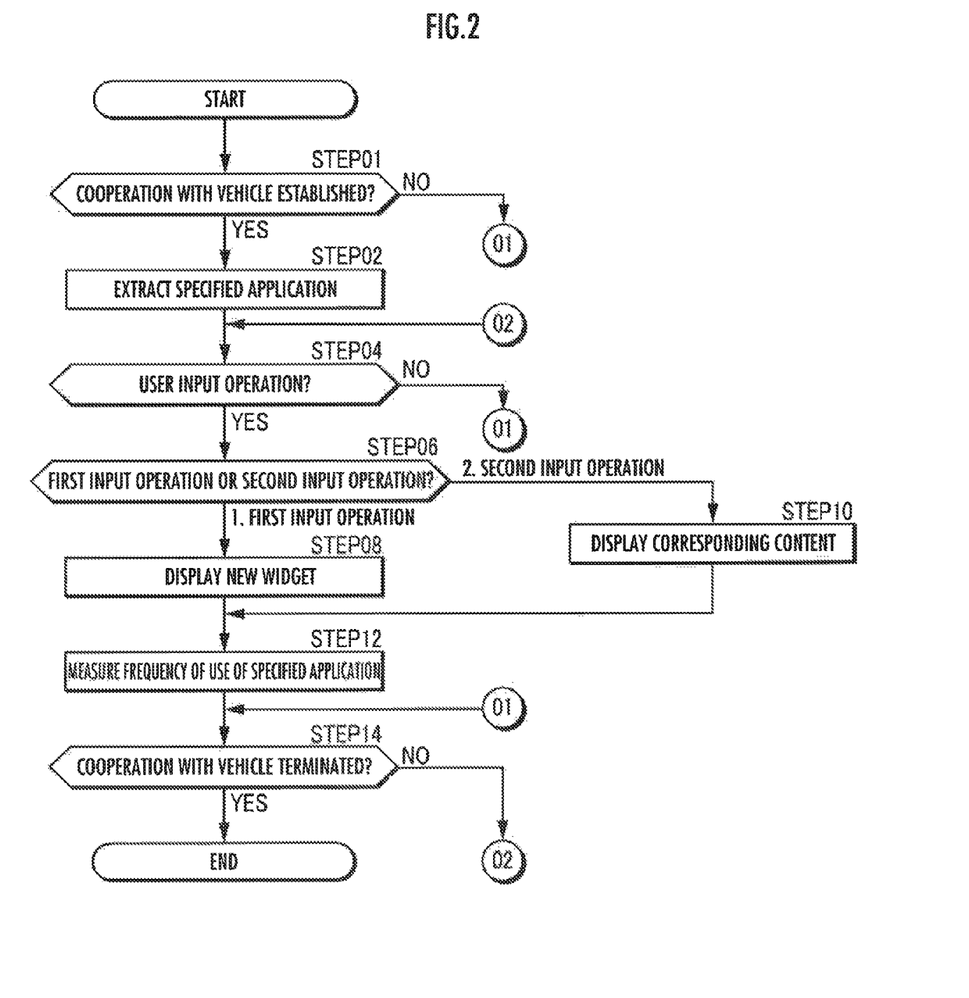
FIG. 2 is an explanatory functional chart of the information terminal as a first embodiment of the present invention.

A specified application that meets specified conditions is extracted from multiple applications installed on the information terminal 1 (STEP02/FIG. 2) on condition that it is determined that the cooperation between the information terminal 1 and the vehicle is established (YES in STEP01/FIG. 2). The specified conditions are defined to prohibit use of the function of an application having a low degree of usefulness or need in view of the traveling safety of the vehicle or the like and to allow use of the function of a specified application having a high degree of usefulness or need for the user of the information terminal. For example, the specified conditions include both of a first specified condition and a second specified condition to be described below.

The "first specified condition" is a condition common to general vehicles, which is defined in view of items common to general vehicles such as traveling safety. For example, the first specified condition is defined by a first entity, such as an organization of multiple vehicle manufacturers. The first specified condition is received by the communication device 13 from the support server or the in-vehicle control device 2, e.g., in the form of a list of applications (whitelist) that meet the first specified condition.

The "second specified condition" is a condition applied to particular vehicles, which is defined in view of items specific to the particular vehicles such as to improve the qualities of services to the users of vehicles manufactured by a particular manufacturer or particular types of vehicles. For example, the second specified condition is defined by a second entity, such as each of vehicle manufacturers, constituting part of the first entity. The second specified condition is received by the communication device 13 from the support server or the in-vehicle control device 2, e.g., in the form of multiple specified categories applied to the particular vehicles among category groups of applications.

When both the first specified condition and the second specified condition as mentioned above are defined as the specified conditions, an application listed in the whitelist and the category of which corresponds to any of the multiple specified categories is extracted as the specified application from the multiple applications installed on the information terminal 1.

Figure 3:
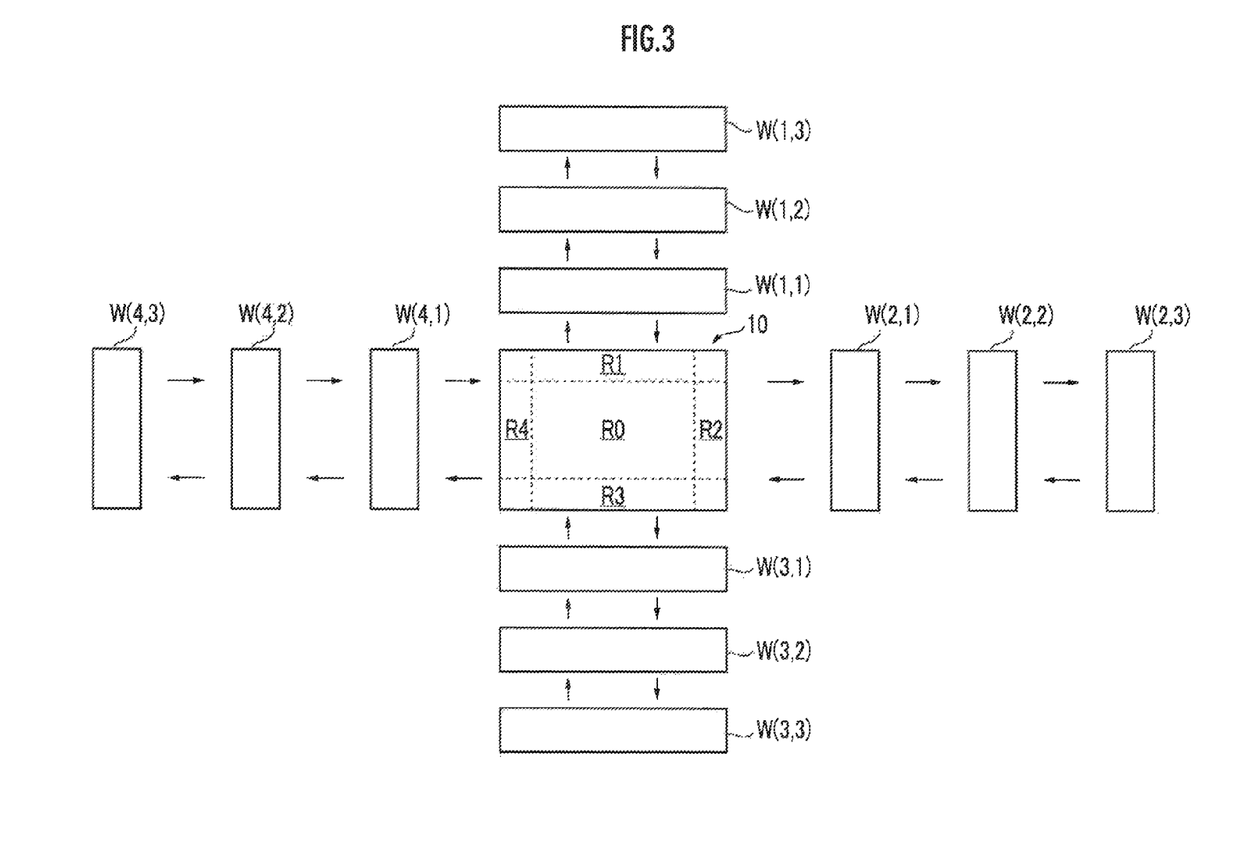
FIG. 3 is an explanatory diagram related to specified regions on a touch panel.

As shown in FIG. 3, the screen of a touch panel having a substantially horizontally-long rectangular shape has specified regions R0 to R4, each of which is individually assigned to each of five specified categories. A reference specified region R0 assigned to a reference specified category is a rectangle-shaped region that occupies a central portion of the touch panel. A first specified region R1 assigned to a first specified category is a horizontally-long rectangular region located at the upper edge of the touch panel. A second specified region R2 assigned to a second specified category is a vertically-long rectangular region located at the right edge of the touch panel. A third specified region R3 assigned to a third specified category is a horizontally-long rectangular region located at the lower edge of the touch panel. A fourth specified region R4 assigned to a fourth specified category is a vertically-long rectangular region located at the left edge of the touch panel. In other words, the specified regions R1 to R4 are arranged in the top orientation, right orientation, bottom orientation, and left orientation, respectively, with reference to an arbitrary point (e.g., center point) in the reference specified region R0 on the touch panel.

FIG. 3 conceptually shows that three widgets $W(i, j_i)$ ($i=1, 2, 3, 4$ and $j_i=1, 2, 3$) are displayed in the i-th specified region Ri on the touch panel sequentially in order. In other words, the number of specified applications classified in the i-th specified category is limited to $j_i$, respectively. The value of the limited number $j_i$ may be 1, 2, or 4 other than 3, or the limited numbers $j_i$ may vary with each specified category. Although the total number of single main application and sub-applications is limited to "13," it may be changed to 5, 6, 15, or the like, as long as it is larger than or equal to the number of specified categories. Further, although the number of specified categories is limited to "5," it may be limited to any plural number, such as 2, 4, or 8.

The number and layout mode of specified regions on the touch panel of the information terminal 1 in a cooperating state with the vehicle may be the same as or different from those in an uncooperating state with the vehicle. The number and layout mode of specified regions on the touch panel of the information terminal 1 in the cooperating state with the vehicle may be defined to be specific to any of the vehicle, the information terminal 1, and a combination of the vehicle and the information terminal 1.

When the screen display mode is switched on the touch panel between a landscape-oriented screen display mode and a portrait-oriented screen display mode automatically or manually, the specified regions R0 to R4 are also defined in the same manner in the portrait-oriented screen display mode.

Figure 4:
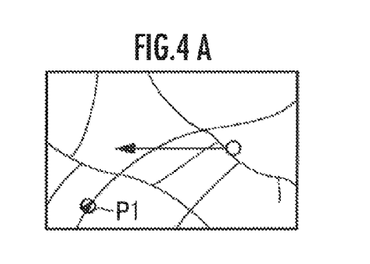
FIG. 4A is an explanatory diagram related to a first display example of the touch panel.
FIG. 4B is an explanatory diagram related to a second display example of the touch panel.
FIG. 4C is an explanatory diagram related to a third display example of the touch panel.
FIG. 4D is an explanatory diagram related to a fourth display example of the touch panel.
FIG. 4E is an explanatory diagram related to a fifth display example of the touch panel.
FIG. 4F is an explanatory diagram related to a sixth display example of the touch panel.

As the "main application" classified in the reference specified category, an application having a map display function is extracted. Thus, as shown in FIG. 4A, a map image that represents the arrangement of roads and the arrangement of facilities in the vicinity in addition to position P1 of the information terminal 1, is displayed at least in the reference specified region R0 (or full-screen on the initial screen after the cooperation between the information terminal 1 and the vehicle) on the touch panel as a functional image.

Specified applications classified in the i-th specified category (i=1, 2, 3, 4) are also extracted as "sub-applications." Thus, a widget W(i, j) as the functional image of a specified application in the j-th rank (j=1, 2, . . . ) classified in the i-th specified category is displayed in the i-th specified region Ri on the touch panel in a manner to be described later. Note that accessory software such as launcher or gadget may be adopted as the functional image instead of the widget.

For example, an application having the function of inputting a keyword or searching for a destination according to the selection, and an application having a route searching function to the destination are extracted as specified applications belonging to the first specified category. An application having the playback function of a music content or a video content is extracted as a specified application belonging to the second specified category. An application having the function of displaying information broadcasting from a base station, such as traffic information, weather information, or current news, is extracted as a specified application belonging to the third specified category. An application having a communication function with any other information terminal or an inter-car communication function is extracted as a specified application belonging to the fourth specified category.

The widgets of the specified applications belonging to the first, second, and fourth specified categories correspond to a "first functional image" functioning as an input interface (or an input interface and an output interface). The widgets of the specified applications belonging to the third specified category correspond to a "second functional image" functioning only as an output interface.

All widgets (functional images) of specified applications may correspond to either the first functional image or the second functional image. The structure may also be such that widgets of some specified applications belonging to the same specified category correspond to the first functional image and widgets of the remaining specified applications correspond to either the first functional image or the second functional image.

The presence or absence of an input operation by the user is determined (STEP04/FIG. 2). When it is determined that there is an input operation (YES in STEP04/FIG. 2), it is then determined whether the input operation is a first input operation or a second input operation (STEP06/FIG. 2). The "first input operation" means an input operation for displaying a new widget. For example, a touch gesture having a directionality to any of top, bottom, left, and right on the touch panel corresponds to the first input operation. The "second input operation" means an input operation for using the function of a specified application corresponding to a widget displayed on the touch panel. For example, a tap, pinch-in, and pinch-out in the display area of the widget correspond to the second input operation.

When it is determined that the current input operation corresponds to the "first input operation" (1 in STEP06/FIG. 2), a new widget is displayed on the touch panel (STEP08/FIG. 2). The new widget is displayed according to the first input operation in a specified region on the side opposite to the directionality as viewed from the reference point of the touch panel.

Figure 4B:
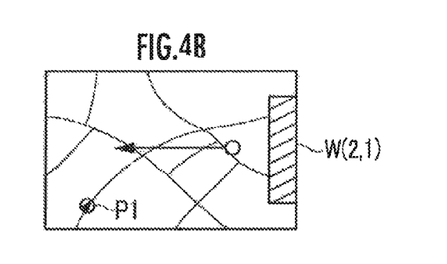

For example, as indicated by an arrow with an open circle in FIG. 4A, when there is a touch gesture having a directionality to the left, such as the left flick or left swipe, on the touch panel where a navigation image is displayed, a new widget W(2, 1) is displayed in the second specified region R2 (see FIG. 3) located at the right edge of the touch panel as shown in FIG. 4B. In other words, a new functional image of the specified application classified in the second specified category is displayed.

Note that various combinations can be adopted, such as that a vector representing the orientation of the display area of the new widget viewed from the reference point of the touch panel to a vector representing the directionality of the touch gesture is oppositely oriented (the angle of the former to the latter is 180°), oriented in the same direction (the angle of the former to the latter is 0°), clockwise perpendicular (the angle of the former to the latter is +90°), or counter-clockwise perpendicular (the angle of the former to the latter is −90°).

After that, each time the first input operation is repeated while the cooperation between the information terminal 1 and the vehicle continues, the current widget is displayed on the touch panel instead of or in addition to the previous widget (see 1→to STEP08 from STEP06/FIG. 2).

When the same mode of first input operation is continuously repeated on the touch panel, the current widget of a specified application in the next rank of a specified application corresponding to the previous widget (the first rank if the rank of the specified application is in the last place) is displayed. For example, as indicated by the arrow with the open circle in FIG. 4B, when there is the same mode of first input operation as the previous one, i.e., a touch gesture having a directionality to the left, such as the left flick or left swipe, on the touch panel where the widget W(2, 1) is displayed, the current widget W(2, 2) of a specified application in the second rank is displayed in the second specified region R2 (see FIG. 3) instead of the previous widget W(2, 1) of the specified application in the first rank as shown in FIG. 4C.

On the other hand, when there is the current first input operation different in mode from the previous first input operation on the touch panel, a new widget of a specified application corresponding to the current first input operation is displayed as the current widget instead of the previous widget. For example, as indicated by the arrow with the open circle in FIG. 4D, when there is the first input operation different from the previous one, i.e., a touch gesture having a directionality to the down side, such as the downward flick or downward swipe here, on the touch panel where the widget W(2, 1) is displayed, the current widget W(1, 1) is displayed in the first specified region R1 (see FIG. 3) as shown in FIG. 4E instead of the previous widget W(2, 1).

For example, in response to a sequence of touch gestures in which the directionality is shifted in the order of right→left→left→up from the initial screen on the touch panel, widgets W(4, 1)→W(2, 1)→W(2, 2)→W(3, 1) are displayed sequentially on the touch panel (see FIG. 3). Further, in this state, in response to a sequence of touch gestures in which the directionality is shifted in the order of up→right→left→left→up on the touch panel, widgets W(3, 1)→W(4, 1)→W(2, 1)→W(2, 2)→W(3, 1) are displayed sequentially on the touch panel (see FIG. 3).

Even when the same mode of first input operation is intermittently performed, the structure may be such that a widget in the next rank of the last-displayed widget is displayed like in the case where the same mode of first input operation is continuously performed. In this case, in response to a sequence of touch gestures in which the directionality is shifted in the order of right→left→left→up→up→right→left→left→up from the initial screen, widgets W(4, 1)→W(2, 1)→W(2, 2)→W(3, 1)→W(3, 2)→W(4, 2)→W(2, 3)→W(2, 1)→W(3, 3) are displayed sequentially on the touch panel.

When it is determined that the current input operation corresponds to the "second input operation" (2 in STEP06/FIG. 2), a content corresponding to the function of a specified application corresponding to the current input operation and a widget to be operated are displayed in a specified region corresponding to this widget (STEP10/FIG. 2).

For example, as shown in FIG. 4E, when a predetermined portion of the widget W(1, 1) is tapped to set a destination, a guide route r from the current location P1 to a destination P2 searched for according to the route searching function of the specified application corresponding to the widget W(1, 1) is displayed on the map as shown in FIG. 4F.

In response to pinch-out and pinch-in in the reference specified region R0 on the touch panel, respectively, the scale of the map image displayed thereon may be changed.

The frequency of use of a specified application the widget (functional image) of which is displayed on the touch panel is measured (STEP12/FIG. 2). For example, based on either or both of the accumulated display time $\Sigma T(i, j)$ of each widget W(i, j) on the touch panel and the accumulated number of times $\Sigma N(i, j)$ of the second input operation, the frequency of use of the specified application as a dependent variable is calculated according to an increasing function with either or both of $\Sigma T(i, j)$ and $\Sigma N(i, j)$ set as main variables. For example, the increasing function is defined according to a calculating formula (frequency of use)=$\alpha \Sigma T(i, j)$ ($\alpha$>0), $\beta\{\Sigma N(i, j)\}^2$ ($\beta$>0), or $\alpha \Sigma T(i, j)+\beta \Sigma N(i, j)$.

Based on the frequency of use, the ranking of specified applications in each specified category is determined. The ranking is so determined in principle that the rank of a specified application will increase as the frequency of use of the specified application increases. On the other hand, the ranking is so determined that the rank of a specified application will be lowered or the specified application will be excluded from specified applications as the frequency of use of the specified application increases in excess of a reference value.

Note that this reference value may not be set for the first specified category to which a specified application having a navigation function highly required for the cooperation between the information terminal 1 and the vehicle belongs. The reference value may also take a different value depending on the distinction among specified categories. For example, the reference value may be set to gradually become smaller in the order of second specified category→fourth specified category→third specified category.

It is determined whether or not the cooperation between the information terminal 1 and the vehicle is terminated (STEP14/FIG. 2). When the determination result is negative (NO in STEP14/FIG. 2), a series of processing in the step of determining the presence or absence of an input operation and the subsequent steps is repeated (see STEP04/FIG. 2). On the other hand, when the determination result is affirmative (YES in STEP 14/FIG. 2), the above-mentioned series of processing is ended.

(Operational Advantages)

According to the information terminal 1 as one embodiment of the present invention, when cooperation with the vehicle is established, a specified application is selected from multiple applications installed in the information terminal 1. Depending on the distinction of directionality among touch gestures on the touch panel, widgets W(i, j) of specified applications belonging to a specified category desired by the user can be displayed in multiple specified regions Ri, each having a certain relation with the directionality, on the touch panel, respectively (see FIG. 3 and FIG. 4A-4F).

This enables the user to use, in a cabin, the function of a specified application having a high degree of usefulness or need with an input operation to a widget W(i, j) (functional image) of the specified application through the touch panel. Further, the convenience of the information terminal when the user uses the function of a specified application classified in the desired specified category can be improved. On the other hand, use of the functions of other applications having a low degree of usefulness or need is prohibited in view of the purpose of driving the vehicle or the like to thereby avoid excessive functions available in the cabin. This can improve the usability of the information terminal for the user in the cabin.

Second Embodiment (Configuration)

Since the configuration of an information terminal 1 as a second embodiment of the present invention is almost the same as the configuration of the information terminal 1 as the first embodiment of the present invention, the description thereof will be omitted (see FIG. 1).

(Function)

Like in the first embodiment, the i-th widget W(i, $j_i$) is displayed to cause the touch panel to function as either or both of the "input interface" and the "output interface" of the present invention (see FIG. 3). Further, images that represent a first widget W(1, $j_1$) and a second widget W(2, $j_2$) correspond to "first images." An image that represents a third widget W(3, $j_3$) corresponds to a "second image." An image that represents a fourth widget W(4, $j_4$) corresponds to the "first image" and the "second image."

The display sustainable time (function enabling time) of the second widget W(2, $j_2$) and the fourth widget W(4, $j_4$) is not limited. On the other hand, the display sustainable time of the first widget W(1, $j_1$) and the third widget W(3, $j_3$) is limited to a relatively short time (e.g., 30 seconds to 10 minutes).

(Operation Acceptance Process)

Figure 5:
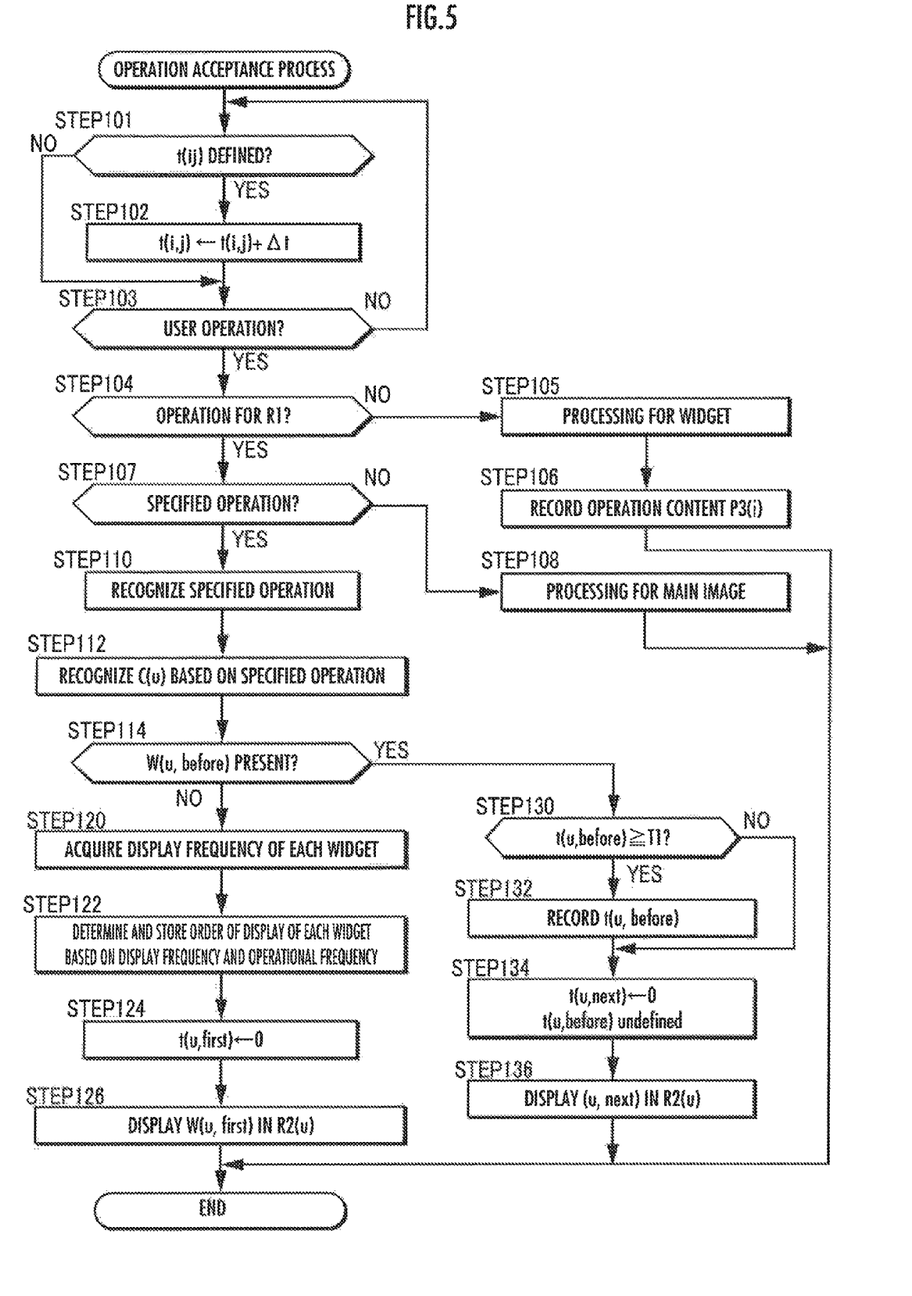
FIG. 5 is a flowchart of an operation acceptance process.
Figure 7:
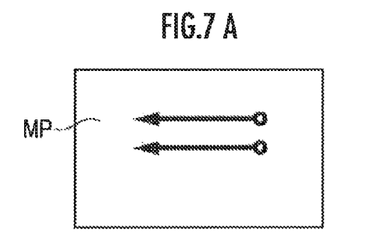
FIG. 7A is a diagram showing a display screen when no widget is displayed.
FIG. 7B is a diagram showing a display screen when a widget is displayed in a region that does not correspond to a specified operation.
FIG. 7C is a diagram showing a display screen when a widget is displayed in a region corresponding to a specified operation.
FIG. 7D is a diagram showing a display screen including a widget displayed by the operation acceptance process.
FIG. 7E is a diagram showing a display screen including another widget displayed by the operation acceptance process.
FIG. 7F is a diagram showing a display screen when information is already displayed in the information display process.
FIG. 7G is a diagram showing a display screen including a widget displayed by the information display process.

The first arithmetic processing element 141 determines whether or not any of the widget display times t(i, j) is defined (STEP101/FIG. 5). As will be described later, the widget display times t(i, j) are time variables defined when widgets W(i, j) in respective corresponding categories are displayed. As shown in FIG. 7A, when any of the widgets W(i, j) are not displayed, the determination result becomes negative. On the other hand, as shown in FIG. 7B or FIG. 7C, in the case any of the widgets W(i, j) is displayed, the determination result becomes affirmative.

When the determination result is affirmative (YES in STEP101/FIG. 5), the first arithmetic processing element 141 adds a processing unit time $\Delta t$ to the defined widget display time t(i, j) (STEP102/FIG. 5).

When the determination result is negative (NO in STEP101/FIG. 5) or after STEP102/FIG. 5, the first arithmetic processing element 141 determines the presence or absence of a user operation to the touch panel (input device 11) (STEP103/FIG. 5). When the determination result is negative (NO in STEP103/FIG. 5), the first arithmetic processing element 141 performs processing in STEP101 and the subsequent steps after the elapse of the processing unit time Δt.

When the determination result is affirmative (YES in STEP103/FIG. 5), the first arithmetic processing element 141 determines whether or not the user operation is an operation to the routine operation region R1 (STEP104/FIG. 5). When the determination result is negative (NO in STEP104/FIG. 5), since the user operation is a widget operation 3(i), the first arithmetic processing element 141 performs processing on a widget W corresponding to the widget operation 3(i) (STEP105/FIG. 5). Then, the first arithmetic processing element 141 stores the content of the widget operation 3(i) in the storage device (STEP106/FIG. 5). After that, the first arithmetic processing element 141 ends the current processing and starts the next processing.

When the determination result is affirmative (YES in STEP104/FIG. 5), the first arithmetic processing element 141 determines whether the user operation is a specified operation (STEP107/FIG. 5). When the determination result is negative (NO in STEP107/FIG. 5), since the user operation is a main image operation 1, the first arithmetic processing element 141 performs processing on the main image as mentioned above (STEP108/FIG. 5). After that, the first arithmetic processing element 141 ends the current processing and starts the next processing.

When the determination result is affirmative (YES in STEP107/FIG. 5), the first arithmetic processing element 141 recognizes a direction having the directionality of the specified operation based on the user operation (STEP110/FIG. 5). For example, when the specified operation has a directionality to the left (left flick P2), "left (left direction)" is acquired.

Based on a correspondence relationship between a predetermined category and the mode of operation, the first arithmetic processing element 141 recognizes a specified category C(u) corresponding to the mode of operation acquired in STEP110/FIG. 5 (STEP112/FIG. 5). For example, when "left" is acquired in STEP110/FIG. 5, the second specified category is recognized.

The first arithmetic processing element 141 determines whether or not there is any widget W (u, before) already displayed in the category (hereinafter called the "current category C(u)" in the description of this processing recognized in STEP112/FIG. 5 (STEP114/FIG. 5).

When the widget W (u, before) in the current category C(u) is not displayed, there is a case where no widget W(i, j) in either category is displayed as shown in FIG. 7A, or a case where a widget W(v, $j_v$) in a category C(v) (v≠u) different from the current category C(u) corresponding to the specified operation is displayed as shown in FIG. 7B.

As shown in FIG. 7A or FIG. 7B, when no widget W(u, before) in the current category C(u) is displayed, the determination result becomes negative (NO in STEP114/FIG. 5). On the other hand, when a widget W(u, before) in the current category C(u) is displayed as shown in FIG. 7C, the determination result becomes affirmative (YES in STEP114/FIG. 5).

When the determination result is negative (NO in STEP114/FIG. 5), the first arithmetic processing element 141 recognizes, from the storage device, the display frequency of each widget during a predetermined period (from the present up to one week before) included in the current category C(u), the accumulated display time, the average value of display time, and the operating frequency (STEP 120/FIG. 5). The display frequency of each widget W(u, $j_u$) included in the current category C(u) is determined from the number of records of display time of the widget W(u, $j_u$) stored in the processing of STEP132/FIG. 5 to be described later. Further, the accumulated display time of each widget W(u, $j_u$) included in the current category C(u) is determined by adding up the widget display time t(u, $j_u$) stored in the processing of STEP132/FIG. 5 to be described later. Further, the average value of the display time of each widget W(u, $j_u$) included in the current category C(u) is determined by dividing the widget display time t(u, $j_u$) by the above-mentioned number of records stored in the processing of STEP132/FIG. 5 to be described later. The operating frequency of each widget W(u, $j_u$) included in the current category C(u) is determined from the content of a widget operation 3(u) stored in STEP106/FIG. 5.

The first arithmetic processing element 141 determines the order of priority of widgets W(u, $j_u$) in the current category C(u) from the recognized display frequency, average value of the display times, and operating frequency of each widget W(u, $j_u$) included in the current category C(u), and stores the order of priority in the storage device (STEP122/FIG. 5). The first arithmetic processing element 141 sets the order of priority of the widget W(u, $j_u$) in the current category higher as the display frequency of the widget W(u, $j_u$) is higher, the accumulated display time of the widget W(u, $j_u$) is longer, the average display time of the widget W(u, $j_u$) is longer, or the operating frequency to the widget W(u, $j_u$) is higher. Using a first conversion formula giving a higher evaluated value as the display frequency of the widget W(u, $j_u$) is higher, a second conversion formula giving a higher evaluated value as the accumulated display time of the widget W(u, $j_u$) is longer, a third conversion formula giving a higher evaluated value as the average display time of the widget W(u, $j_u$) is longer, and a fourth conversion formula giving a higher evaluated value as the operating frequency to the widget W(u, $j_u$) is higher, the order of priority of the widget W(u, $j_u$) may be set higher as the total value of the first to fourth conversion formulas is larger.

Based on the determined order of priority of the widget W(u, $j_u$), the first arithmetic processing element 141 defines, as zero, a widget display time t(u, first) corresponding to a widget W(u, first) the order of priority of which ranks first (STEP124/FIG. 5).

The first arithmetic processing element 141 displays the widget W(u, first), the order of priority of which ranks first, in a widget region R2(u) corresponding to the current category C(u) as shown in FIG. 7D (STEP126/FIG. 5).

After STEP126/FIG. 5, the first arithmetic processing element 141 ends the current processing and starts the next processing.

Next, since the widget W(u, before) in the current category C(u) is displayed as shown in FIG. 7C, the determination result in STEP114 becomes affirmative (YES in STEP 114/FIG. 5). This processing is performed when a specified operation is repeated without interval or when a widget W(i, j) (=W(i, before)) corresponding to the specified operation continues to be displayed after the previous specified operation. In the former case, the widget display time t(i, j) is zero or almost zero, while in the latter case, the widget display time t(i, j) is considerably long compared to the widget display time t(i, j) in the former case.

Next, the first arithmetic processing element 141 determines whether or not the widget display time t(u, before) of the widget W(u, before) already displayed is equal to or longer than a predetermined time T1 (STEP130/FIG. 5). The predetermined time T1 is a time period (e.g., 10 seconds) during which it is recognized that the user had an intention to display the widget W(u, before). As mentioned above, when a long time has passed since the previous specified operation was performed, since the widget display time t(u, before) becomes long, the determination result becomes affirmative. On the other hand, when a specified operation is continuously performed, since the widget display time t(u, before) is zero or a value close to zero, the determination result becomes negative.

When the determination result is affirmative (YES in STEP130/FIG. 5), the first arithmetic processing element 141 stores the widget display time t(u, before) in the storage device (STEP132/FIG. 5). This stored widget display time t(u, before) is used in STEP 120/FIG. 5 as mentioned above.

In other words, the widget display time t(u, before) is recorded only when it is recognized that the user intentionally displayed the widget W(i, before). Thus, in the processing of STEP122/FIG. 5, the order of priority of each widget W(i, j) is determined based on the display time and the number of times of display. This makes user's preference easier to be reflected in the order of priority of widgets.

When the determination result is negative (NO in STEP130/FIG. 5) or after STEP132/FIG. 5, the first arithmetic processing element 141 defines, as zero, a widget display time t(u, next) corresponding to a widget W(u, next) in the next rank of the widget W(u, before) (see FIG. 7C) being currently displayed, based on the order of priority determined in STEP122/FIG. 5, and makes W(u, before) undefined (STEP134/FIG. 5). The first arithmetic processing element 141 refers to the storage device to display the widget W(u, next) in the widget region R2(*u*) (see FIG. 7E) (STEP136/FIG. 5).

After STEP136/FIG. 5, the first arithmetic processing element 141 ends the current processing and starts the next processing.

(Information Display Process)

Next, an information display process executed by the second arithmetic processing element 142 to display information regardless of a user operation when receiving the information from the outside such as the support server will be described.

Figure 6:
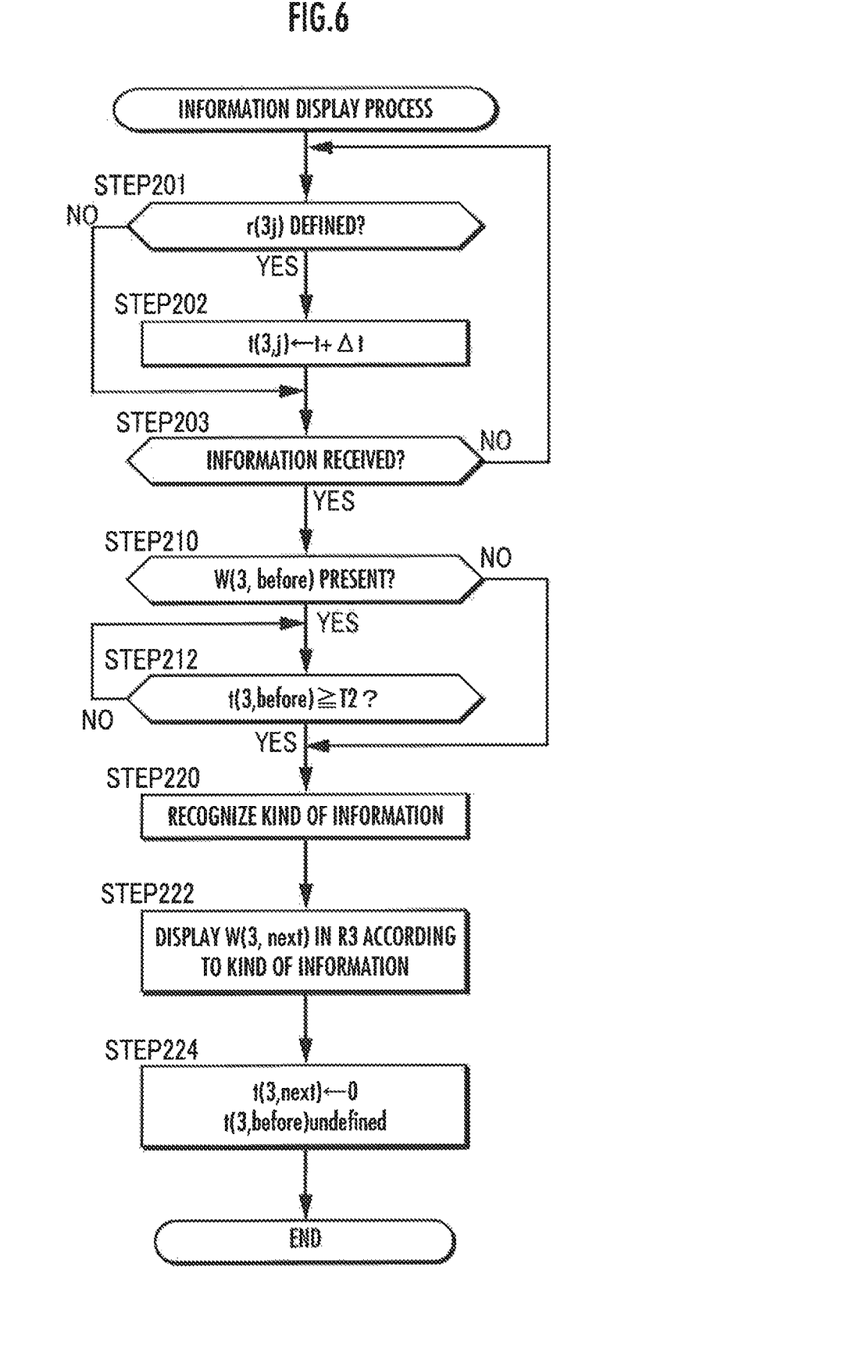
FIG. 6 is a flowchart of an information display process.

The second arithmetic processing element 142 determines whether or not a widget display time t(3, j) corresponding to the information category (fourth category) is defined (STEP201/FIG. 6).

The widget display time t(3, j) is a time variable defined when the widget W(3, j) corresponding to the information category (fourth category C(4)) is displayed.

When the determination result is affirmative (YES in STEP201/FIG. 6), the second arithmetic processing element 142 adds the processing unit time At to the widget display time t(3, j) (STEP202/FIG. 6).

When the determination result is negative (NO in STEP201/FIG. 6) or after the processing of STEP202/FIG. 6, the second arithmetic processing element 142 determines whether or not specified information from the outside is received (STEP203/FIG. 6). The specified information from the outside includes traffic information and weather information from the support server, current event information from a news server, and peripheral information from the vehicle (e.g., information from a rear camera at the start of driving the vehicle in reverse).

When the determination result is negative, the second arithmetic processing element 142 performs processing in STEP201/FIG. 6 and subsequent steps. On the other hand, when the determination result is affirmative, the second arithmetic processing element 142 performs processing in STEP210/FIG. 6 and subsequent steps.

When a long time has passed since the previous information from the outside was received, since STEP201 to STEP202 in FIG. 6 are repeated, the widget display time t(3, j) becomes long.

On the other hand, when information is received again immediately after the previous information is received, since STEP201 to STEP202 in FIG. 6 are hardly repeated, the widget display time t(3, j) becomes zero or a value close to zero.

When the determination result in STEP203/FIG. 6 is affirmative (YES in STEP203/FIG. 6), the second arithmetic processing element 142 determines whether or not a widget W(3, before) is displayed in the downside widget region R3 as shown in FIG. 7F (STEP210/FIG. 6).

When the determination result is affirmative (YES in STEP210/FIG. 6), the second arithmetic processing element 142 determines whether or not the widget display time t(3, before) is equal to or larger than a predetermined value T2 (STEP212/FIG. 6). The predetermined value T2 is a time period enough for the user to recognize the information (e.g., 10 seconds). When the determination result is negative, the processing in STEP212/FIG. 6 is performed again.

When the determination result in STEP210/FIG. 6 is negative (NO in STEP210/FIG. 6) or when the determination result in STEP212/FIG. 6 is affirmative, the second arithmetic processing element 142 recognizes the kind of information received (STEP220/FIG. 6). Kinds of information include traffic information, weather information, current news, and peripheral information around the vehicle.

The second arithmetic processing element 142 selects a widget W(3, next) according to the recognized kind as shown in FIG. 7G, and displays the widget W(3, next) in the downside widget region R3 within the display screen (STEP222/FIG. 6).

The second arithmetic processing element 142 makes the widget display time t(3, before) undefined, and sets the widget display time t(3, next) to zero (STEP224/FIG. 6).

After STEP224/FIG. 6, the second arithmetic processing element 142 ends the current processing and starts the next processing.

(Widget Hiding Process)

The first arithmetic processing element 141 hides a target widget W(i, j) based on at least either a condition that a displayable time has passed since the widget W(i, j) was displayed or a condition that the main image operation 1 or a widget operation 3(*i*) for hiding the widget W(i, j) is accepted. In this case, the first arithmetic processing element 141 sets a widget display time t(i, j) corresponding to the widget W(i, j) to an undefined state.

The first arithmetic processing element 141 may also hide all displayed widgets W(i, j) on condition that an operation for holding down a "HOME button" provided in a main image MP is detected.

(Operational Advantages)

According to the information terminal 1 as the second embodiment of the present invention, the touch panel composed of the input device 11 and the output device 12 functions as either or both of the output interface and the input interface (hereinafter collectively called the "interface") related to a category associated with a specified operation on condition that the specified operation has been performed. As a result, the need for the user to pay attention to the screen such as to watch the screen carefully in order to use a function related to the category or to output information classified in the category, is reduced. Therefore, usability can be improved.

According to the configuration of the information terminal 1, even when there are multiple interfaces classified in some or all of the categories, respectively, a specified operation corresponding to each of the categories can be repeated to cause the touch panel function as an interface desired by the user. As a result, the need for the user to pay attention to the screen such as to watch the screen carefully in order to use the function related to the category or acquire information classified in the category, is reduced. Therefore, the usability of the information terminal (information terminal 1) can be improved.

It is highly probable that a frequently-used interface will be an interface desired by the user in the future. According to the information terminal (information terminal 1) configured by paying attention to this point, the order of priority of the frequently-used interface is set high. As a result, it is highly probable that input and output devices can be caused to function as interfaces desired by the user with a small number of specified operations thereafter. Therefore, the usability of the information terminal (information terminal 1) can be improved.

According to the information terminal 1 having the above configuration, a first image or a second image (i.e., a widget W(i, $j_1$) including the image as a constituent element) is displayed in a region Ri (Ii=1, 2, 3, 4) present in an orientation on the side opposite to the orientation (lower, left, upper, right) corresponding to the directionality of a specified operation on the display screen with respect to the reference point, respectively. Thus, a feeling of strangeness given to the user is reduced compared to the case where the first image or the second image (to be exact, the widget W(i, ji) including the image) is displayed in an orientation having no relation to the orientation corresponding to the directionality of the specified operation in an output image. As a result, the usability of the information terminal 1 can be improved.

Depending on the arrangement relation between the user and the input device 11 and the output device 12 of the information terminal 1, it may be difficult for the user to perform some specified operations. Further, it may be preferred that some or all pieces of information received from the outside should be displayed even when the user does not perform any specified operation. According to the information terminal 1 configured by paying attention to these points, a second image (i.e., a widget W(3, $j_3$) including the image as a constituent element) including received information is displayed in the third specified region R3 specified beforehand on condition that the information corresponds to specified information. As a result, the received information is output to the third specified region R3 adequately while omitting a user specified operation. Therefore, the usability of the information terminal 1 can be improved.

The display of either or both of the first image and the second image in the longer-edge regions R1 and R3 of the touch panel (output device 12) for a long period of time tends to reduce the visibility of the touch panel significantly, compared to the display of either or both of the first image and the second image in the shorter-edge regions R2 and R4 of the touch panel for a long period of time. According to the information terminal 1 configured by paying attention to this point, either or both of the first image and the second image, whose function enabling times (display sustainable times) are long (i.e., a widget W(2, $j_2$) and a W(4, $j_4$) including the images as constituent elements, respectively), are displayed in the shorter-edge regions R2 and R4 of the touch panel, and either or both of the first image and the second image, whose function enabling times are short (i.e., a widget W(1, $j_1$) and a W(3, $j_3$) including the images as constituent elements, respectively), are displayed in the longer-edge regions R1 and R3 of the output device. As a result, since the significant reduction in visibility is avoided, the usability of the information terminal can be improved.

According to the information terminal of the configuration, a search category C(1), a copyrighted work category C(2), a communication category C(3), and an information category C(4), in which the user is highly interested, are categorized individually. As a result, since the touch panel can be caused to function as interfaces for the categories C(1) to C(4), in which the user is highly interested, with specified operations, the need for the user to pay attention to the screen such as to watch the screen carefully is reduced. As a result, the usability of the information terminal can be improved.

The specified operations are made distinct based on an operation mode of an operation kind "two-finger flick operation" as to "in which direction, up, down, left, or right, the flick operation is," but the present invention is not limited thereto. For example, the distinction may be made based on an operation mode of an operation kind "double tap" as to "where to tap on the display screen, obliquely right upward, obliquely left upward, obliquely left downward, or obliquely right downward."

(Other Embodiments of Present Invention)

In the aforementioned embodiments, only the functional image of the main application is displayed on the initial screen of the touch panel (see FIG. 4A). As another embodiment, at least one of the widgets of specified applications corresponding to sub-applications may be displayed on the initial screen of the touch panel (see FIG. 4B or FIG. 4D). Even in this case, the screen of the touch panel is shifted according to the subsequent first input operation in the same manner as in the aforementioned embodiment (STEP08/FIG. 2).

The control device 14 may also be configured to be able to switch from a first state (see FIG. 4B or FIG. 4D) in which the map image of the main application and the widget W(i, j) of a sub-application are displayed on the touch panel according to a predetermined mode of user touch gestures on the touch panel to a second state (see FIG. 4A) in which only the map image is displayed on the touch panel.

In the aforementioned embodiments, a widget W(i, j) (functional image) is so displayed that a distinction in the category of each specified application can be identified from a difference in display area R(i) or display position of the widget W(i, j) on the touch panel (see FIG. 3). However, in addition to or instead of this, the widget W(i, j) (functional image) may be so displayed on the touch panel that the distinction in the category of each specified application can be identified from a difference in design (color, shape, or pattern, or a combination thereof).

What is claimed is:

1. An information terminal including an input device, an output device, a communication device, and a control device, and having a cooperation function with equipment using communication through the communication device, wherein the control device is configured to identify presence or absence of cooperation between the information terminal and the equipment, extract a specified application per se, that meets a specified condition from a plurality of applications installed on the information terminal on condition that presence of cooperation between the information terminal and the equipment is identified, and display, on the output device, a functional image corresponding to a function of the specified application, wherein the control device is configured to extract the specified application, by having both a first specified condition common to general equipment and a second specified condition applied to specific equipment, as the specified condition.

2. The information terminal according to claim 1, wherein the control device is configured to extract the specified application by setting, as the specified condition or the second specified condition, a fact that the specified application is classified in any of a plurality of specified categories applied to specific equipment, and to display the functional image of the specified application in a specified region individually assigned to each of the plurality of specified categories on the output device, respectively.

3. The information terminal according to claim 2, wherein the control device is configured to limit the number of extracted specified applications in each of the plurality of specified categories.

4. The information terminal according to claim 2, wherein the control device is configured to limit the number of specified categories, and then to extract the specified application.

5. An information terminal including an input device, an output device, a communication device, and a control device, and having a cooperation function with equipment using communication through the communication device, wherein the control device is configured to determine presence or absence of cooperation between the information terminal and the equipment, extract a specified application that meets a specified condition from a plurality of applications installed on the information terminal on condition that the information terminal and the equipment are determined to cooperate with each other, and display, on the output device, a functional image corresponding to a function of the specified application, wherein the control device is configured to extract the specified application, by having both a first specified condition common to general equipment and a second specified condition applied to specific equipment, as the specified condition, wherein the control device is configured to extract the specified application by setting, as the specified condition or the second specified condition, a fact that the specified application is classified in any of a plurality of specified categories applied to specific equipment, and to display the functional image of the specified application in a specified region individually assigned to each of the plurality of specified categories on the output device, respectively, and wherein in the case where an identical specified category among the plurality of categories is repeatedly recognized based on a mode of input operation by a user to the input device and where a plurality of specified applications are classified in the identical specified category, the control device is configured to display functional images of the plurality of specified applications on the output device, while switching among the functional images sequentially according to ranking of the plurality of specified applications.

6. The information terminal according to claim 5, wherein the control device is configured to measure frequency of use of a function of each of the plurality of specified applications belonging to the identical specified category to set a rank of each of the plurality of specified applications according to such a rule that increases a probability of being in a higher rank as the frequency of use is higher.

7. The information terminal according to claim 5, wherein the control device is configured to measure frequency of use of a function of each of the plurality of specified applications belonging to the identical specified category, and to set a rank of each of the plurality of specified applications according to such a rule that lowers the rank or increases a probability of being excluded from specified applications as the frequency of use increases in excess of a reference value.

8. An information terminal including an input device, an output device, a communication device, and a control device, and having a cooperation function with equipment using communication through the communication device, wherein the control device is configured to determine presence or absence of cooperation between the information terminal and the equipment, extract a specified application that meets a specified condition from a plurality of applications installed on the information terminal on condition that the information terminal and the equipment are determined to cooperate with each other, and display, on the output device, a functional image corresponding to a function of the specified application, wherein the control device is configured to extract the specified application, by having both a first specified condition common to general equipment and a second specified condition applied to specific equipment, as the specified condition, wherein the control device is configured to extract the specified application by setting, as the specified condition or the second specified condition, a fact that the specified application is classified in any of a plurality of specified categories applied to specific equipment, and to display the functional image of the specified application in a specified region individually assigned to each of the plurality of specified categories on the output device, respectively, and wherein the control device is configured to display a first functional image, which causes the output device to function as an input interface to make a function of the specified application available to be used by a user, as a functional image of the specified application classified in a first specified category among the plurality of specified categories, and to display a second functional image, which causes the output device to function as an output interface, as a functional image of the specified application classified in a second specified category among the plurality of specified categories.

* * * * *